May 18, 1965 G. R. BRANDT 3,184,525
METHOD OF MOLDING A FILM FROM A FLUORINE-CONTAINING RESIN
Filed Oct. 31, 1961
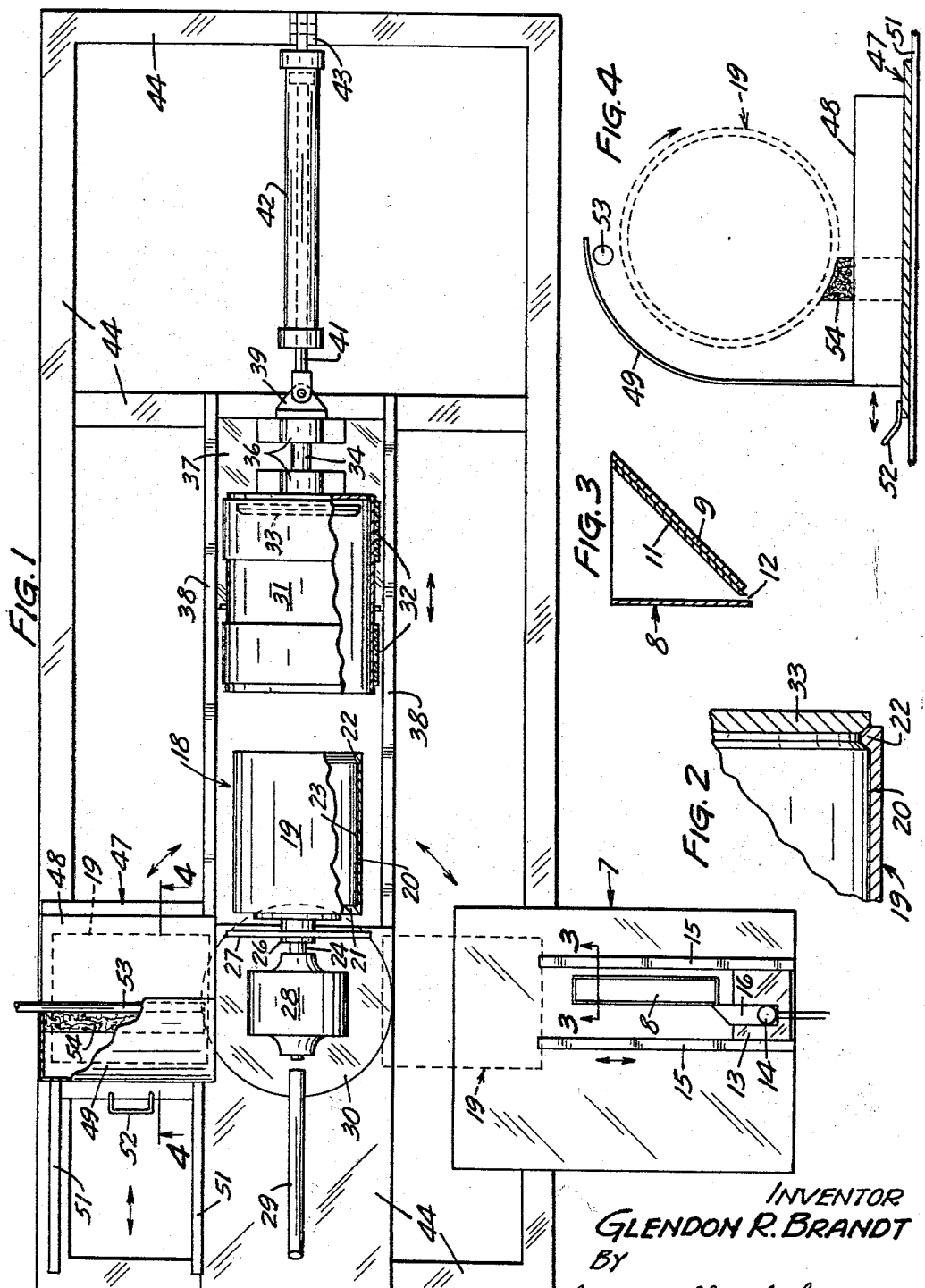
INVENTOR
GLENDON R. BRANDT
BY
Carpenter, Abbott, Coulter & Kinney
ATTORNEYS

United States Patent Office

3,184,525
Patented May 18, 1965

3,184,525
METHOD OF MOLDING A FILM FROM A
FLUORINE-CONTAINING RESIN
Glendon R. Brandt, White Bear Lake, Minn., assignor to Minnesota Mining and Manufacturing Company, St. Paul, Minn., a corporation of Delaware
Filed Oct. 31, 1961, Ser. No. 148,974
8 Claims. (Cl. 264—127)

This invention relates to a new method for molding high viscosity fluorine-containing polymers. Another aspect of this invention relates to a method for preparation of self-supporting films of fluorine-containing polymers. In still another aspect, this invention relates to an endless belt of a fluorine-containing thermoplastic.

Numerous fluorine-containing thermoplastic and elastomeric polymers are known in the art. The homopolymer of trifluorochloroethylene is a thermoplastic having a high molding temperature and a very high viscosity under molding conditions. Other fluorine-containing polymers of a similar nature include thermoplastic and elastomeric homopolymers of trifluorochloroethylene or tetrafluoroethylene and copolymers of trifluorochloroethylene or tetrafluoroethylene with other ethylene-unsaturated fluorine-containing monomers such as vinylidene fluoride, vinyl fluoride, perfluoropropene, trifluoropropene, trifluorobutadiene, and difluorodichloroethylene. Self-supporting films have been prepared from these thermoplastic and elastomeric polymers. However, the technique for preparing self-supporting films from these polymers is complicated and expensive. The most common method for preparing films is extrusion. However, the films thus produced frequently contain flaws due to bubbles and in many instances are of non-uniform thickness. In addition, the conditions under which the extruded film is made causes severe degradation of the polymer which results in a film having properties less desirable than the original polymer. Some of these deficiencies of extruded film may be overcome by casting films from solutions or plastisols. However, most of the fluorine-containing polymers are not soluble in conventional solvents and plastisols are difficult if not impossible to make from the polymers. The few solvents that may be used are very expensive and hazardous.

One specific form of film is an endless belt. Such endless belts have many conventional uses known to those skilled in the art. However, it has been substantially impossible to produce a satisfactory endless belt of fluorine-containing polymers and when it is possible, the process technique, which is usually extrusion, is expensive and wasteful. The extruded tubing must be cut to size. The resulting endless belt has the same deficiencies as the above-described films and in addition is under considerable stress because of the orientation of the polymers during extrusion. As a result of the stress or orientation, the dimensions of the endless belt change upon ageing.

It is much to be desired, therefore, to provide a method to produce plastic films from fluorine-containing polymers which overcome the above difficulties as well as to provide a new and useful endless belt of fluorine-containing polymers.

An object of this invention is to provide a process for making self-supporting films of fluorine-containing polymers.

Another object of this invention is to provide a new and useful endless belt prepared from fluorine-containing polymers.

Still another object of this invention is to provide a more economical molding process which eliminates processing waste and trimming operations.

Yet another object of this invention is to provide self-supporting films of fluorine-containing polymers having dimensional stability.

Yet another object of this invention is to provide self-supporting films and molded articles of fluorine-containing polymers which have less degradation than results from conventional processes.

Another object of this invention is to prepare non-oriented plastic films with embossed surfaces.

Still another object of this invention is to provide a film and a process for making same which is substantially free from bubbles and other similar flaws.

Various other objects and advantages of the present invention will become apparent to those skilled in the art from the accompanying description and disclosure.

According to this invention, films or other molded articles are prepared from fluorine-containing polymers by uniformly spreading powdered polymer inside of an axially rotating molding cylinder. The powdered polymer is uniformly spread throughout the molding cylinder while the cylinder is being rotated at a sufficiently high speed that the polymer particles are stationary. Due to the fact that fluorine-containing polymers have such a high viscosity at the molding conditions, it is impossible to introduce the polymer into the molding cylinder in a fluid condition, and it is impossible for the polymer to become sufficiently fluid at the elevated temperature of molding to uniformly distribute itself upon the rotating cylinder surface. Therefore, it is essential to the present invention that means be provided for uniformly and evenly distributing the powdered particles upon the inside surface of the rotating cylinder.

After the powder is thus uniformly distributed in the rotating molding cylinder, the molding cylinder is heated under confined conditions to a sufficiently high temperature while still rotating that the powdered particles fuse together in the form of a continuous, self-supporting film. This condition is achieved with the use of elevated temperatures for sufficient time for incipient fusion to take place.

After the powdered polymer has achieved its state of fusion sufficient to form a continuous surface, preferably homogeneous, on the inside of the rotating cylinder, the rotating cylinder is then rapidly cooled while still rotating to solidify the film within the cylinder. Cooling is usually achieved by spraying or contacting the cylinder with water or other cooling fluid. After the rotating cylinder is cooled, the rotating cylinder is then stopped for the first time, and the film is peeled from the inside of the molding cylinder in the form of an endless belt or film. The resulting film is substantially free from bubbles and other flaws, is dimensionally stable because it is substantially free from orientation and is of uniform gauge and thickness. The inner surface of the belt or film will correspond to the surface of the rotating molding cylinder; therefore, it is essential when it is desired to obtain a smooth film to use a smooth molding surface. On the other hand, where configurations or designs are desired on one surface of the film, the molding cylinder may be cut or grooved corresponding to the desired design. The film will reproduce the design precisely. Thus a knurled belt can be easily and conveniently produced in this manner.

The uniformity of the distribution of powdered polymer upon the molding surface of the rotating drum determines the uniformity of the gauge thickness of the resultant film. Molding under confined conditions assures a smooth surface on both sides of the film because it prevents the evaporation of plasticizers from the polymer and decreases the turbulence of the air within the molding cylinder. Uniform heating of the molding cylinder is also essential to provide an ultimate film of uniform physical properties.

FIGURE 1 of the accompanying drawing is a top view of a diagrammatic illustration of the molding apparatus used in the process of this invention.

FIGURE 2 is a broken-away, enlarged cross-section of the molding cylinder, viewed along 2—2 of FIGURE 1.

FIGURE 3 is a diagrammatic view in cross-section of the feeding mechanism, viewed along 3—3 of FIGURE 1.

FIGURE 4 shows a diagrammatic elevational end view of the cooling apparatus, viewed along 4—4 of FIGURE 1.

For a better understanding of the invention, reference will now be made to the drawing with a description of the parts of the apparatus and their operation in accordance with this invention.

FIGURE 1, as previously stated, is the top view of the apparatus. Numeral 19 indicates a cylindrical molding drum which is in a position ready for molding. The feeding position of molding cylinder 19 is shown in relief with relation to a feeding mechanism indicated by numeral 7. The cooling position of the molding drum 19 (shown in relief) is indicated by numeral 47. The molding drum 19 is positioned in each of these positions by being pivoted on a pivot plate 30 which supports a driving mechanism 28 for cylinder 19.

Proceeding with the various operating stages in sequence, the feeding mechanism 7 comprises a feeding trough 8 of triangular cross-section as shown in cross-sectional view along line 3—3 in FIGURE 3. Trough 8 as shown in FIGURE 3 has an angular side 9 upon which is positioned a sliding or adjustable side 11 to regulate the opening of elongated slot 12. The positioning of adjustable side 11 is effected by conventional means not shown. Opening 12 is regulated in relation to the particle size of the molding powder such that the distribution of the powdered polymer within the cylindrical drum 19 is uniformly effected. Feeding trough 8 is spaced above a slidable base 13 and is attached to base 13 through arm 16 by conventional means not shown. Base 13 slides in a track 15 so that it may be moved backward and forward as shown in the drawing to be inserted or removed from the inside of molding cylinder 19. When inserting trough 8, slidable base 13 moves under and free from cylinder 19. Numeral 14 is a conventional electrical or pneumatic vibrator which is attached to the fixed end of trough 8 by means of arm or bar 16. The vibrator facilitates the uniform flow of particles through slot 12 of feeding trough 8.

The molding apparatus is shown by numeral 18 in FIGURE 1. This apparatus includes the cylindrical molding drum or cylinder 19, motor 28 and oven 31. The inside molding surface of cylinder 19 is indicated by numeral 20. This surface is smooth when it is desired to prepare a smooth film, or designed or grooved when it is desired to prepare a design on the surface film. The molded film is indicated by numeral 23 within molding drum 19. One end 21 of the drum 19 is permanently closed as shown, while the other end of the drum is open and contains a beveled lip 22 for holding the molding powder therein and for engaging a circular end plate 33.

FIG. 2 shows an enlarged cross-section of lip 22. The inside angled portion of lip 22 provides for channeling small size plastic particles back onto molding surface 20. Molding drum 19 is attached by a rotatable shaft 24 to a conventional motor 28. Shaft 24 passes through a bearing 26 which is attached to a stationary circular end plate 27, which end plate is attached to pivot plate 30 by means not shown. Shaft 24 passes through end plate 27 and is freely rotatable in bearing 26. End plate 27 serves as a closure for an oven 31, to be discussed hereinafter, and as a support for rotatable shaft 24. Motor 28 is firmly affixed to pivot plate 30 which can revolve 180° or more, so as to place molding cylinder 19 into position for loading with powder from feeding trough 8 or for cooling in cooling apparatus 47. Rotation of pivot plate 30 is effected manually by means of a lever or arm 29 attached to pivot plate 30 and is locked into the desired position by a locking pin not shown. The cylindrical oven closure 31 fits over or encloses rotatable molding cylinder 19 in a fixed or stationary position. Around oven 31, at each end thereof, is provided electrical heating means 32. These electrical heaters 32 are insulated and lagged. Oven 31 is attached to base plate 37 by conventional means. Within oven 31 is end plate 33 which is beveled for fitting into lip 22 of molding cylinder 19. This beveled end plate 33 is attached to a rotatable shaft 34 and passes freely through the end of oven 31. Shaft 34 is supported by thrust bearings 36 as shown. Thrust bearings 36 are attached by conventional means to support 37. The combination of plate 33, shaft 34 and thrust bearings 36 assists in maintaining dynamic balance of molding cylinder 19 during rotation. Support 37 is slidable upon track 38. One end of a pneumatic plunger 42 is connected by means of a boss member 43 to a table or stationary base support 44. The other end of plunger 42 is attached to plate 37 through a plunger shaft 41 and boss member 39. Support member 44 also supports pivot plate 30, feeding unit 7, track 38 and track 51.

The cooling unit is indicated by numeral 47 which comprises a water trough or reservoir 48 having a splash hood 49, which is slidable on track 51. Numeral 52 indicates a handle for sliding the unit on track 51 in the directions as shown. A cross-sectional view in the direction 4—4 is diagrammatically illustrated in FIGURE 4. In addition to the above features, FIGURE 4 illustrates a wick 54 of leather, fabric or felt, for wetting the sides of molding drum 19 when it is in the cooling position. Numeral 53 indicates a perforated air conduit or manifold adapted to eject a stream of air opposite to the direction of rotation of drum 19 during cooling. The air stream aids in the evaporation of the water and increases the rate of cooling, and also helps prevent splattering of water during rotation.

In the operation of the molding apparatus as shown in FIGURE 1, a weighed quantity of a fluorine-containing thermoplastic in powder or granular form, such as a homopolymer of trifluorochloroethylene having a ZST of about 234 (plasticized with about 35 weight percent trifluorochloroethylene oil—ZST after plasticization about 140) is placed in trough 8 while side 11 is positioned such that opening 12 is closed. The powdered polymer is distributed uniformly along the length of trough 8. The molding cylinder 19 is coated on the inside surface thereof with trifluorochloroethylene telomer oil which has been heated to about 400° F. to facilitate distribution. Coating the molding surface with plasticizer aids in maintaining the plasticizer content of the plastic constant during molding. Molding cylinder 19 is pivoted by arm 29 into axial alignment with trough 8 and locked into place. Cylinder 19 is then rotated by motor 28 at about 800 to about 1500 r.p.m. The trough 8 is then inserted by sliding base 13 along track 15 such that the slot 12 of trough 8 is in alignment with the width of molding surface 20. The sliding side 11 is withdrawn a predetermined amount to open slot 12 and the trough vibrated by means of vibrator 14 until all of the powdered polymer is evenly and uniformly distributed over the entire cylindrical surface 20 of drum 19. Thereafter trough 8 is removed from the inside of drum 19 along track 15, and drum 19 while still rotating is then pivoted to and locked in the molding position as shown in FIGURE 1 of the drawing.

While drum 19 is still rotating at about 800 to about 1500 r.p.m., oven 31 which is continuously being heated is moved into place over drum 19 by means of plunger 42. Plunger 42 slides support plate 37 along track 38 until end plate 33 engages the beveled lip 22 of the open end of molding drum 19. The plunger forces plate 33 firmly against the end of drum 19 to securely seal the drum, and a predetermined pressure is maintained against the drum 19 and plate 33 by means of plunger 42 throughout the entire molding operation. Plate 33 and plunger 42 act as a relief valve to prevent the build-up of excess pressure in molding cylinder 19. Heating elements 32 raise the temperature of the oven to at least about 620° F., preferably about 650° F. to about 660° F. The rotation of drum 19 is continued at 800 to 1500 r.p.m. for about one minute and then is increased to between about 5000 and about 6000 r.p.m. or more. The centrifugal pressure should be at least 0.5 pound per square inch on the polymer. The temperature is measured by means of thermocouples (not shown) attached to the inner surface of oven 31 below heaters 32 and by a thermocouple attached to the inner surface in the middle unheated portion of oven 31. When the temperature of the oven reaches about 650° F., the rotation is continued for about five minutes or more. The overall time for the heating operation and the molding operation is about twenty to twenty-five minutes, depending, however, on the polymer being molded. After about twenty-five minutes, heating elements 32 are turned off and the rotation of the drum is allowed to drop to about 800 to 1500 r.p.m. for cooling. Oven 31 is retracted by means of plunger 42 to completely clear cylindrical drum 19.

While still rotating, cylinder 19 is pivoted on plate 30 by means of lever 29 to the position shown in relief in cooling unit 47 of FIGURE 1 and locked in place. In cooling unit 47, trough 48 contains water and the wick 54 is pressed against the side of rotating cylinder 19 by means of handle 52. Air is jetted through perforated conduit 53 to aid in the cooling of cylinder 19. Cylinder 19 is rapidly cooled to a temperature below 150° F., usually to approximately room temperature, in about ten minutes. After cooling, the rotation of cylinder 19 is stopped and the film or endless belt 23 is removed by slipping a knife or spatula under lip 22 of the open end of cylinder 19 to lift up the film which is then peeled from the surface 20 of the cylinder 19 and removed from the inside of the cylinder.

The method or technique of molding of this invention can be used to make films, endless belts, gaskets, lockseals, lip-seals, etc., without departing from the scope of the invention.

Various conventional automatic mechanical and timing means may be used to provide fully automatic operation of the cycle without departing from the scope of this invention.

The following examples are offered as a better understanding of the present invention and are not to be construed as unnecessarily limiting thereto.

EXAMPLE I

An endless belt of a thermoplastic polymer of trifluorochloroethylene was prepared with the apparatus of the drawing. The endless belt had a dimension of 11 15/16 inches lay-flat x 9 3/8 inches wide x 10 mils thick. For preparing such a belt, a steel molding cylinder having a molding surface of 7.665 inches in diameter x 9 3/8 inches wide was used. The inside of the molding drum was nickle-plated. A silicone resin was applied to the inside molding surface and heated to about 600° F. for about sixteen hours. The surface was then polished with a soft cloth to remove excess silicone resin. The molding surface was then coated with trifluorochloroethylene telomer oil plasticizer. The oven consisted of a steel tubing with an inside diameter ½-inch larger than the outside diameter of the molding cylinder. Two 200-volt, 2300-watt heater bands positioned around the oven and insulated, as shown in FIGURE 1 of the drawing as numeral 32, supplied the exterior heat needed for molding. Three thermocouples were attached to the inside of the oven, one at each end of the cylinder adjacent the heaters and one in the middle section of the oven. These thermocouples were used to control the oven temperature. Water was used to cool the drum after molding.

About 81 grams of powdered polytrifluorochloroethylene plastic of a ZST of 235 (ZST after 35 weight percent plasticizer—140) having a maximum particle size of about 150 microns was placed in feeding trough 8 of FIGURE 1. The feeding trough 8 was then inserted into the molding drum 19 while the drum was rotating at about 1000 r.p.m. Vibrator 14 was turned on and a uniform layer of powder was deposited on the inside surface of the molding cylinder. The above quantity of plastic had been determined as the amount required for making the belt of the dimensions previously stated.

After the feeding trough had emptied all of the powder on the inside surface of the molding cylinder, the feeding trough 8 was removed and the revolving drum 19 was rotated in the position shown in FIGURE 1 of the drawing. Oven 31 was inserted over the molding cylinder. The oven was warm from a previous molding run. End plate 33 of the oven locked into place in beveled lip 22 of molding drum 19. The heat controls of the oven were set at 650° F. for the heater band at one end of the oven and for 620° F. (the best temperature settings as determined by previous runs) for the heater band at the other end of the oven. Table 1 below shows time, temperature and speed of the oven during the cylindrical molding operation.

*Table 1*

| Time lapse | Thermocouples, °F. | | | |
| --- | --- | --- | --- | --- |
| | Left end | Center | Right end | |
| After 5 mins | 620 | 540 | 615 | |
| After 10 mins | 640 | 560 | 610 | |
| After 15 mins | 635 | 570 | 610 | (to max. 5,700 r.p.m.) |
| After 20 mins | 645 | 580 | 615 | |
| After 22 mins | 640 | 585 | 615 | |

By rotating the molding cylinder at the speed of about 1000 r.p.m., the powdered plastic is allowed to become thoroughly and uniformly heated to the conversion temperature of about 620° F. By increasing the speed to about 6000 r.p.m., the resin becomes homogeneous and is forced against the surface of the molding cylinder. Due to the high viscosity of the plastic at the molding temperature, the plastic does not flow in the molding cylinder.

Table 2 below shows the molding force at various revolutions per minute of the molding drum.

*Table 2*

| R.p.m. | Pressure, p.s.i. | G's |
| --- | --- | --- |
| 4,000 | 1.3 | 1,700 |
| 5,000 | 2.1 | 2,700 |
| 5,700 | 2.8 | 3,500 |
| 6,000 | 3.1 | 3,900 |

After the above molding cycle had been completed, the oven 31 was removed from the molding cylinder 19 and the molding cylinder revolved into the cooling position where the air was rapidly cooled with water and the rotating speed dropped to about 800 r.p.m. An air blast accelerated the evaporation of water, increasing the cooling rate. After the molding cylinder had been cooled to room temperature, the rotation of the cylinder was stopped and the finished endless belt removed from the inside of the molding cylinder. The ZST of the finished belt was approximately 125.

When the polymer has reached the conversion temperature and the centrifugal pressure applied to the polymer is equal over the entire surface of the belt, a condition results in which the polymer can form itself to the contour of the molding surface while at the conversion temperature. Because the polymer does not flow during molding or cooling, no orientation stresses are built up in the final film. The result is that the belt or film has excellent dimensional stability upon ageing. Under cross-polarized light no visible stresses were apparent. As compared to extruded film, the polytrifluorochloroethylene plastic film prepared as above had a considerably higher ZST value. For example, a similar extruded film using a polytrifluorochloroethylene polymer, ZST 235, containing 25 weight percent telomer plasticizer had a ZST of only 105. Both ejection molding and extrusion confine the resin during conversion, thus preventing the escape of gases from the plastic. In centrifugal molding, gases are permitted to escape and the final product is therefore free from bubbles or voids. As a result of the enclosed molding cylinder, plasticizers in the powdered plastic are not volatized as rapidly as would be the case in extrusion or other types of open molding.

A knurled belt was produced in the above manner by machining grooves circumferentially into the inside surface of the molding drum and then casting the belt as above described.

EXAMPLE II

An endless belt was prepared in a manner similar to Example I from extrusion-grade Teflon (a copolymer of tetrafluoroethylene and a small amount of perfluoropropene) having a maximum particle size of 300 microns. The drum 19 was loaded with 80 grams of this copolymer. The heat controls of the oven were set at about 700° F. for the heater band at one end of the oven and about 670° F. for the heater band at the other end of the oven. Otherwise the procedure was substantially the same as for Example I for time, rotation speed, etc. The top rotation speed of the molding drum was about 5900 r.p.m. A smooth uniform flexible belt was successfully produced by the above method.

EXAMPLE III

Another run was made on Teflon homopolymer to produce an endless belt in a manner similar to Example I. For this run on Teflon homopolymer (homopolymer of tetrafluoroethylene), the controllers for the heater bands were set at 800° F. and 790° F., respectively. The molding drum 19 was charged with 60 grams of tetrafluoroethylene homopolymer screened to 420 microns as the largest particle size. After loading the drum with powdered homopolymer, the drum was rotated at about 6000 r.p.m. to pack the powder. The drum was then slowed to about 1500 r.p.m. for about 15 minutes and then speeded up to a maximum speed of 6000 r.p.m. and held for about 40 minutes. A tough, flexible, well-knit endless belt was produced with the homopolymer of tetrafluoroethylene.

The present technique works exceptionally well for producing films of fluorine-containing polymers of the examples which have a viscosity greater than 100,000 poises at the molding temperature. This viscosity includes the viscosity decrease as a result of plasticizers. Various modifications of time, rotation speeds and other operating techniques may become apparent to those skilled in the art without departing from the scope of this invention.

Having described my invention, I claim:

1. A process for making film of fluorine-containing solid polymers which comprises evenly and uniformly distributing a powdered fluorine-containing solid polymer over the inside surface of a cylindrical molding drum, rotating said molding drum on its axis at a sufficiently high speed that the powder particles are stationary, heating said powdered polymer in said molding drum during the rotation of same to the film-forming temperature, thereafter cooling the polymer while still rotating said molding drum, and removing the resulting film from said molding drum.

2. A process for making film of fluorine-containing solid polymers which comprises evenly and uniformly distributing a powdered fluorine-containing solid polymer over the inside surface of cylindrical molding drum, rotating said molding drum on its axis at an r.p.m. sufficient to create a centrifugal pressure of at least 0.5 p.s.i., heating said powdered polymer in said molding drum during the rotation of same to at least the incipient fusion temperature of the polymer, thereafter cooling the polymer below its fusion temperature while still rotating said molding drum, and removing the resulting film from said molding drum.

3. A process for making film of fluorine-containing solid polymers which comprises rotating a cylindrical molding drum at a relatively low r.p.m., evenly and uniformly distributing a powdered fluorine-containing solid polymer over the inside surface of said rotating cylindrical molding drum, enclosing both ends of said molding drum, rotating said molding drum on its axis at a relatively high r.p.m. sufficient to create a centrifugal pressure of at least 0.5 p.s.i., heating said powdered polymer in said molding drum during the rotation of same to at least the incipient fusion temperature of the polymer, thereafter rotating said molding drum at a relatively low r.p.m., cooling the polymer below its fusion temperature while rotating said molding drum at said low r.p.m., and removing the resulting film from said molding drum.

4. The process of claim 3 in which a liquid plasticizer for said polymer is coated on the inside molding surface of said molding drum prior to distributing said powdered polymer over the inside surface thereof.

5. The process of claim 3 in which the inside surface of said molding drum is smooth.

6. The process of claim 3 in which the inside surface of said molding drum is embossed.

7. A process for making film of a solid polymer of trifluorochloroethylene which compriess rotating a cylindrical molding drum at an r.p.m. of between about 800 and about 1500, evenly and uniformly distributing powdered trifluorochloroethylene solid polymer over the inside surface of said rotating cylindrical molding drum, enclosing said molding drum, rotating said molding drum on its axis at an r.p.m. of at least 5000, heating said powdered polymer in said molding drum during the rotation of same to at least 620° F., thereafter rotating said molding drum at a low r.p.m. between about 800 and about 1500, rapidly cooling the polymer below about 150° F. while rotating said molding drum at said low r.p.m., and removing the resulting film from said molding drum.

8. A process for making film of a solid polymer of tetrafluoroethylene which comprises rotating a cylindrical molding drum at a relatively low r.p.m., evenly and uniformly distributing a powdered tetrafluoroethylene solid polymer over the inside surface of said rotating cylindrical molding drum, enclosing said molding drum, rotating said molding drum on its axis at a relatively high r.p.m. sufficient to create a centrifugal pressure of at least 0.5 p.s.i., heating said powdered polymer in said molding drum during the rotation of same to at least 670° F., thereafter rapidly cooling the polymer below about 150° F. while still rotating said molding drum, and removing the resulting film from said molding drum.

References Cited by the Examiner

UNITED STATES PATENTS

| | | | |
|---|---|---|---|
| 2,736,925 | 3/56 | Heisler et al. | 264—310 XR |
| 2,742,446 | 4/56 | Schwarzenbek | 264—127 XR |
| 2,961,703 | 11/60 | Pinotti | 18—26 |
| 2,980,965 | 4/61 | Infantino et al. | 264—127 |
| 3,041,671 | 7/62 | Ericson | 18—26 |
| 3,044,124 | 7/62 | Valentine | 18—58.3 |
| 3,048,896 | 8/62 | Marlo | 18—58.3 |

FOREIGN PATENTS 221,297  5/59  Australia.

ALEXANDER H. BRODMERKEL, *Primary Examiner.*

MICHAEL V. BRINDISI, *Examiner.*